United States Patent [19]

Rattunde

[11] Patent Number: 4,547,182

[45] Date of Patent: Oct. 15, 1985

[54] FLAT OR PLATE LINK- ARTICULATED CHAIN, PARTICULARLY FOR USE IN STEPLESS VARIABLE-RATIO TRANSMISSIONS

[75] Inventor: Manfred Rattunde, Bad Homburg, Fed. Rep. of Germany

[73] Assignee: Reimers Getriebe AG, Zug, Switzerland

[21] Appl. No.: 613,371

[22] Filed: May 23, 1984

[30] Foreign Application Priority Data

Jul. 6, 1983 [DE] Fed. Rep. of Germany ....... 3324318

[51] Int. Cl.⁴ .............................................. F16G 1/22
[52] U.S. Cl. ...................................... 474/214; 474/213
[58] Field of Search .............................. 474/212–217, 474/206, 241, 242, 245

[56] References Cited

U.S. PATENT DOCUMENTS

| 1,578,271 | 3/1926 | Dull et al. | 474/214 |
| 1,598,906 | 9/1926 | Dull | 474/214 |
| 1,689,556 | 10/1928 | Nichols | 474/213 |
| 1,734,688 | 11/1929 | Morse | 474/213 |
| 1,919,768 | 7/1933 | Brandt | 474/213 X |
| 2,223,314 | 11/1940 | Cumfer | 474/213 X |
| 4,058,021 | 11/1977 | Wood | 474/213 X |
| 4,292,031 | 9/1981 | Rattunde | 474/18 |

FOREIGN PATENT DOCUMENTS 3027834 11/1982 Fed. Rep. of Germany.

Primary Examiner—Stephen J. Novosad
Assistant Examiner—Thuy M. Bui
Attorney, Agent, or Firm—Frishauf, Holtz, Goodman & Woodward

[57] ABSTRACT

The link plates of the articulated chain are so located that a connecting line through the centers of gravity of neighboring transversely adjacent link plates (1, 2) forms, throughout a major portion of its length, an essentially straight line extending across the chain and at an inclination with respect to the longitudinal extent of the chain, to thereby prevent application of excessive bend-through forces on a cross joint element (3) such as a cross bolt.

2 Claims, 2 Drawing Figures

FLAT OR PLATE LINK- ARTICULATED CHAIN, PARTICULARLY FOR USE IN STEPLESS VARIABLE-RATIO TRANSMISSIONS

Reference to related application, assigned to the assignee of the present invention: U.S. Ser. No. 285,869, filed July 22, 1981, RATTUNDE & SCHOPF, corresponding to German Patent No. 30 27 834.

The present invention relates to variable-ratio transmissions, and more particularly to a flat or plate link-articulated chain for use in such transmissions, in which the chain travels between a pair of opposed cones which may move towards or away from each other, thus placing the chain at different radial positions on the cone and, thereby, varying the transmission ratio from a drive connected to the cones to another element coupled to the chain, for example another cone assembly.

BACKGROUND

Cone assemblies of the type to which the present invention relates are described, for example, in U.S. application Ser. No. 285,869 filed July 22, 1981; other types of double-cone infinitely variable ratio transmissions may be used. The transmission chains utilize connecting elements which connect individual flat or plate links and are inserted in openings of the plate links; the end facing surfaces of the connecting elements transmit frictional forces between the conical friction disks and the articulated chain, as a whole. Various arrangements of plate or flat links and connecting elements are possible, and the referenced U.S. application Ser. No. 285,869, of July 22, 1981 shows two such arrangements, one in which the links are all positioned in-line, and one in which the links are positioned in-line with adjacent links being staggered in brick-wall manner to offset the joints between adjacent links by one through-connecting element. In another arrangement, which has been termed a "three-link arrangement", similarly located end portions of a link—for example at the left side of the chain when it is stretched out—are offset by two cross-connecting elements so that the transverse staggering pattern of the links will repeat for each three links, rather than for each alternate one. Link chains of this type may use bolts as transversely located cross-connecting elements, and/or pairs of rocking elements which are shaped to roll off with respect to each other, or may have rocker elements which cooperate with the radially extending end portions of the link plates. The "joints" referred to hereinafter may, for simplicity, be considered merely as joint bolts. The type of connection, which permits articulation of the chain and bending of the chain around a wheel, for example within the cone surfaces of an infinitely variable ratio transmission, are a simple form; the type of link articulation which is used with the chain is not material and any one known in the art may be used.

The two types of link chains—alternately staggered or of the three-link arrangment—have different characteristics, particularly when used in an infinitely variable ratio transmission. The three-link arrangement permits a shorter subdivision of the links since they can be placed closer together with respect to each other, thus contributing to smoother operation, lower noise level, and better distribution of frictional forces between the cone wheels of the transmission itself and the link elements, or the end portions of the cross-connecting elements, for example and typically bolts. The frictional force density of chains of this type is reduced over chains with alternately staggered links. The alternately staggered links, however, for a given load or torque transmission capability are smaller and narrower, and lighter. Overall, the three-link arrangement is to be preferred since the wear on the cone wheels is reduced, the bending radius of the chain is less, and the operating noise is substantially less; yet, the greater width of the chain and in the alternately staggered arrangement was usually used due to the lesser requirement of space.

THE INVENTION

It is an object to improve the structure of three-link arrangement articulated chains which permit greater transfer of force of torque from a variable-ratio transmission without impairing the advantages thereof.

Briefly, the positions of the links in the three-link arrangement is so selected that the link plates are positioned and retained in the chain by connecting elements which are placed such that a connecting line through the centers of gravity of neighboring, immediately adjacent transverse link plates forms, throughout a major portion of its length, an essentially straight line extending across the chain at an inclination with respect to the longitudinal direction of the chain.

DRAWINGS

FIG. 1 is a schematic representation, and a diagram of forces acting on a three-link arrangement articulated chain in accordance with the prior art, in which the schematic representation and the force diagram are to be considered together and shown in alignment; and FIG. 2 is a schematic representation of the chain, and schematic diagram in accordance with the present invention.

DETAILED DESCRIPTION

Figure 1:
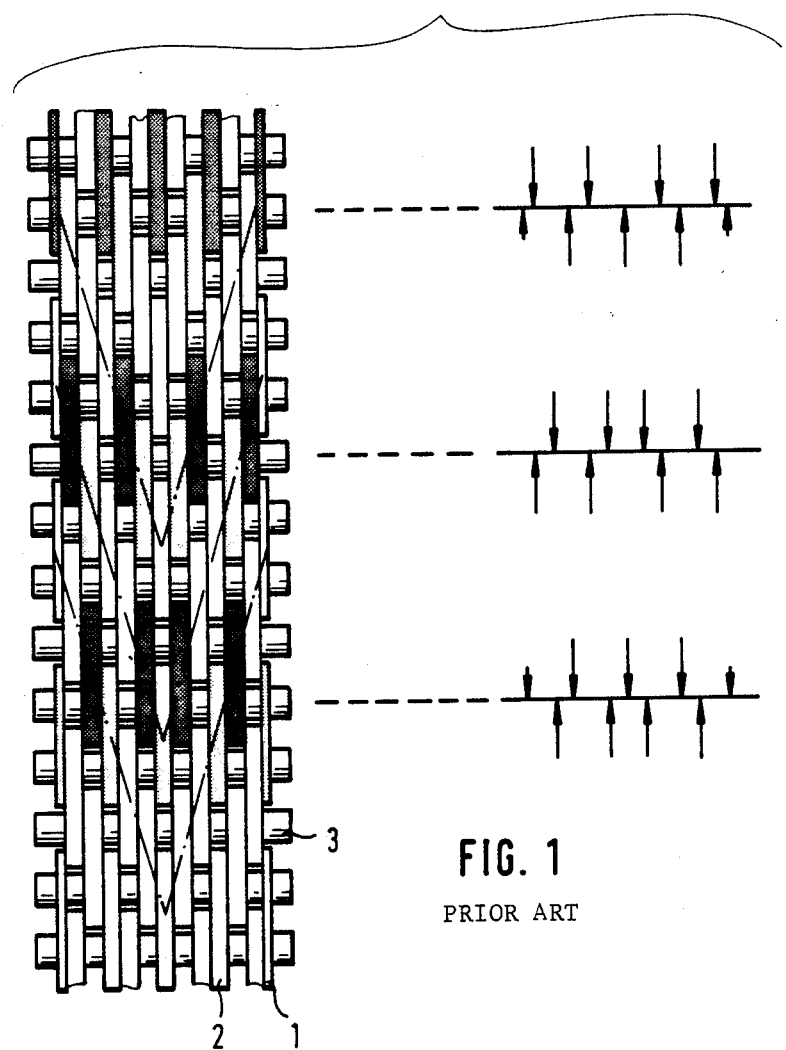

In the Figures, forces acting on the link elements from below are shown, in the chain representation, by dark shading; forces acting from above are shown by light shading. The forces themselves are shown in the force diagram on the right portion of the Figure by respective arrows from above and below; the spacing of the forces acting on the elements of the chain are shown to the same scale as the chain; the level of the force, however, as represented by the length of the arrows, is only schematically indicated and corresponds to the forces which can be accepted by the links in relation to their respective thicknesses. The actually occurring forces will differ from those shown in the drawings due to differences in strain, and longitudinal extensions of the links.

FIG. 1 shows a three-link arrangement articulated chain, as described, for example, in detail in the aforementioned U.S. application Ser. No. 285,869, of July 22, 1981. The chain has outer plate links 1, which may have a thickness less than interiorly placed plate links 2. All the plate links are connected by cross-connecting elements 3, typically bolts, rocker elements, or the like. The cross-connecting joints, which permit articulation of the respective links, pass through openings formed in the links 1, 2. To obtain an overall cross section which is uniform, transversely to the longitudinal extent of the chain—up and down in the Figure—and for symmetrical arrangement, the outer links 1 have a thickness which is only half as great as that of the inner links 2. Overall, for each link or link portion, the same cross-sectional area of the links engaging any one cross joint or bolt 3 will obtain.

As best seen in FIG. 1, the links 1, 2 are located symmetrically with respect to a center line of the chain. The centers of gravity of adjacent or neighboring links, in transverse configuration, thus will fall on lines which have a V-shaped configuration. The right-side portion of FIG. 1 illustrates the forces acting on the links of the chain at selected bolts or cross connections. These forces will vary with respect to adjacent cross bolts 3. For better illustration, the diagrams at the right were drawn for the fourth and eighth link, from a reference link, respectively, in order to provide diagrams which can be readily visualized. Of course, the second diagram from the top could also have been placed at the cross bolt immediately beneath the top diagram, and the third diagram from the top immediately therebelow, as an inspection of the positions of the respective links 1, 2 with respect to the cross bolts will immediately show. The expansion or "explosion" of the diagrams, thus, is for ease of representation. Actually, the respective force diagrams recur in three immediately adjacent cross joints or bolts 3.

Referring to FIG. 1, it can be seen that the central one of the force diagrams is the critical one. While the top and bottom force diagrams show an essentially symmetrical application of forces from above and below on the respective links, the center diagram clearly shows that, starting from the left, two torque or moment pairs are present acting in clockwise direction; on the right side, two torque or moment pairs are provided which act in counterclockwise direction. The overall result will be a substantial resulting transverse torque or bending moment which has the tendency to bend through the link element 3, typically a cross bolt, in the middle. This can also be seen by the two adjacent forces acting from the top which are not balanced by intervening counteracting forces from the bottom.

The tendency to central bending of the joint element 3 leads to substantial differences in loading or straining of the plate links, starting from the middle towards the outside of the chain. These bending forces act, usually, within the range of the elasticity of the material. The cross link element 3 at which the forces become critical must accept non-uniform loading transferred from the plate links, and varying substantially from the central portion towards the outside. Since the chain must have an overall transverse load accepting characteristic, the chain either will be incapable of carrying the loading over its entire width at that particular cross joint or bolt, or an overall excess dimensioning with respect to the other cross bolts must be made. Thus, either one of the bolts is overstressed, or other bolts are excessively dimensioned.

The concept must be stressed that the critical link element 3 is that one in which the inner plate links 2 are all positioned within the outer plate links 1. The respective dark and light shading of the plate links 1, 2 illustrates the forces which are applied to the cross elements 3—the forces acting from below being dark-shaded, and those from the top being light-shaded.

In accordance with the present invention, the load distribution on the links is changed to prevent these unbalanced torques from arising. The arrangement of the links is shown in FIG. 2, and the load distribution illustrated in a manner comparable to that of FIG. 1.

The chain includes, again, outer and inner links 1, 2. The force representation of FIG. 2, again, is expanded or "exploded" in a manner similar to FIG. 1. The shading, likewise, is dark for forces from below, and light for forces from above.

Figure 2:
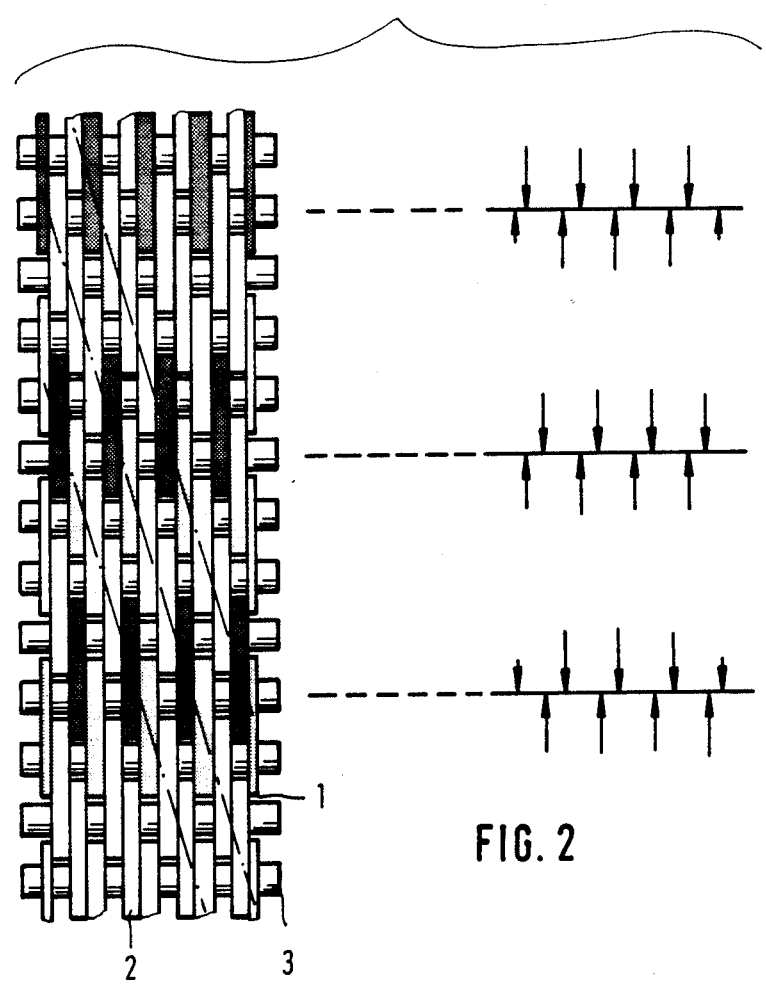

As can be seen in FIG. 2, the links are so placed that a connecting line of the centers of gravity thereof extends, essentially, at an inclination with respect to the longitudinal extent of the chain. The line is straight, as clearly shown by the chain-dotted lines in the left side of FIG. 2. "Straight" is true for the central portions of the chain; at the ends, however, the line slightly deviates from a straight line since the outer links 1 are thinner than the inner links 2. Thus, the lines which connect the centers of gravity can be termed "essentially straight".

The load diagrams on the right side of FIG. 2 clearly show the difference. The central diagram of FIG. 2, in comparison with the central diagram of FIG. 1, clearly shows that if the forces accepted by the plate links are proportional to their thickness a torque or moment results which applies rotary forces in clockwise direction, which torque is twice as great as the torque or moment tending to turn in counterclockwise direction of the torques acting on immediately adjacent cross elements 3, as shown by the upper and lower loading diagrams, respectively. A loading force, however, which cumulatively bends the cross joint 3, does not arise. As can be clearly seen from the load diagrams of FIG. 2, the sum of the loads placed on the respective links, with respect to the width of the chain, is less unbalanced than in the loads placed on the links if the links are arranged as shown in FIG. 1.

The force representations at the right side of FIGS. 1 and 2 are proportional with respect to each other, both as far as direction and magnitude and forces to be accepted by the respective links is concerned. Thus, the forces accepted by the end links are represented by arrows of only half the length of the others, that is, of forces accepted by the inner links 2, since the links 1 have only half the thickness. The representation is schematic, and theoretical insofar in that the actually occurring forces deviate in dependence on elongation of the respective link elements of the chain, when loaded.

Comparing the lines connecting the centers of gravity of the links 1, 2 with each other, that is, the chain-dotted lines of FIGS. 1 and 2, it will be clearly apparent that the connecting lines of the chain in accordance with the present invention are essentially straight, and inclined with respect to the longitudinal direction of the chain. In contrast, the prior art chain of FIG. 1 has connecting lines which form a V, symmetrically to a center line of the chain. It has been found that such a central symmetrical chain structure has disadvantages with respect to load distribution on the respective individual links and joints which change, in rhythm of three respectively sequential joint elements, so that the overall load distribution is undesirable. This load distribution has been explained in connection with the diagrams at the right side of FIG. 1, particularly the central diagram thereof. The sum of the forces acting on the joint results in bend-through thereof. It is difficult to make these joint elements completely stiff and resistant to bend-through, so that, in use, they will deflect, resulting in differential longitudinal expansion of the plate links which are joined at the joints 3. The force distribution and tensioning of the chain with respect to its transverse or cross dimension then will change, and result in non-uniform loading of the respective links. Damage may result to those cross joint elements 3, as well as the links engaging them, which are subjected to the force distribution as shown in the center diagram of FIG. 1, namely the particularly cross element 3 which is not bounded by an outside or end link 1. This non-uniform distribution of forces on the respective joint elements 3 limits the load carrying capability of the chain of FIG. 1. Either the load carrying capability is decreased, or the remaining elements and links must be excessively dimensioned.

The force diagram of FIG. 2 shows the improvement obtained by the chain in accordance with the present invention by re-arranging the positions of the links such that lines drawn through the centers of gravity of the links will be straight across the chain—at an inclination, of course—and will not have a V point at a central line of symmetry. The arrangement then will no longer result in accumulated bend loading on any one cross bolt, thus increasing the overall strength of the chain by about 10%. It has been found that bend-through of the critical joint can be decreased to about ¼ of the value which arose in a chain in accordance with FIG. 1. Free resulting torque moments may occur which might lead to twisting of the joints in the plane of the chain if the forces acting on the links are proportional to their thickness. These forces act at the joints. In actual operation, however, an overall balance will arise and differential forces acting on the links, and differential expansion are so small that any resulting twist or inclination of the chain or of any one link can be neglected. Any twist which is applied to the link which might be considered the critical link—the one which does not have an outer link 1 attached thereto—thus will not twist to an extent which might interfere with proper operation of the chain. It has been found the non-unformity of the loading of the respective elements of the chain is less than a symmetrical arrangement of the links as shown in FIG. 1, for example, and in which lines connecting the centers of gravity are V-shaped.

The chain in accordance with the present invention does not require any additional material, or any additional costs in its manufacture; the number and type of the links as well as of the joint elements, typically cross bolts 3, has remained the same. The number and thickness of the links may be selected in accordance with design criteria, and the only desirable change in thickness of the links is maintenace of a difference between the outer links 1 and the inner links 2, that is, to form the outer links 1 with half the thickness of the inner links 2. The variation in the number of rows of the respective links, and their stagger, is only half as much in the chain of FIG. 2 as that in the chain of FIG. 1 since a central line of symmetry no longer pertains. The number of links 1, 2 can be varied by three, each, in order to obtain chains of suitable width; in the symmetrical arrangement of FIG. 1, the number must be changed each time by six, namely three at each side of the center line of symmetry, in order to obtain the same cross-sectional area of the links at any one transverse position, and a variation in the thickness of individual links is applied only to the outer links 1. This is a desirable arrangement, from manufacturing points of view, and maintaining all links to the same size, with only the outer links 1 of half thickness, as shown in FIG. 1, is a preferred structure.

I claim:

1. In combination with a stepless variable-ratio double-cone transmission having facing, variably spaced conical surfaces of transmission wheels, a flat or plate link elongated chain which, in operation of the transmission, is placed between the facing conical surfaces of the transmission wheels and engaged at lateral sides by said facing conical surfaces, said chain having a plurality of link plates (1, 2) in which some of the link plates are positioned—transversely with respect to the chain—in parallel arrangement with respect to each other, and connected to further link plates located in longitudinal direction of the chain, and a plurality of connecting elements (3) connecting together respectively transversely adjacently positioned link plates, the end surfaces of the connecting elements being adapted to frictionally engage the conical surfaces of the transmission wheels and transferring forces between the conical surfaces and the chain link plates, and wherein the link plates (1, 2) are interconnected in a three-link arrangement in which similarly located end portions of the link plates are offset by two connecting elements (3) to provide for a transversely staggered pattern arrangement of the links which repeats for each three links; and the link plates (1, 2) are positioned and retained in the chain by the connecting elements (3) in an arrangement wherein a connecting line through the centers of gravity of neighboring transversely adjacent link plates (1, 2) forms, throughout a major portion of its length, an essentially straight line extending across the chain and at an inclination with respect to the longitudinal direction of the chain.

2. Link chain according to claim 1, wherein the link plates (1) positioned at transversely extreme sides of the chain are thinner than the link plates in transversely intermediate position;

and said connecting line is straight through the links located in transversely intermediate positions, and deviates from said straight line at said extremely positioned link plates.

* * * * *